(12) United States Patent
Bonen

(10) Patent No.: US 11,469,938 B1
(45) Date of Patent: Oct. 11, 2022

(54) DISTRIBUTED SCHEDULING IN REMOTE PHY

(71) Applicant: Harmonic, Inc., San Jose, CA (US)

(72) Inventor: Adi Bonen, Belle Mead, NJ (US)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 17/110,915

(22) Filed: Dec. 3, 2020

Related U.S. Application Data

(60) Provisional application No. 62/944,651, filed on Dec. 6, 2019.

(51) Int. Cl.
*H04L 27/36* (2006.01)
*H04H 20/69* (2008.01)
*H04L 47/12* (2022.01)
*H04L 12/28* (2006.01)
*H04L 27/34* (2006.01)

(52) U.S. Cl.
CPC ............ *H04L 27/361* (2013.01); *H04H 20/69* (2013.01); *H04L 12/2801* (2013.01); *H04L 27/3405* (2013.01); *H04L 47/12* (2013.01)

(58) Field of Classification Search
CPC ............... H04L 27/361; H04L 12/2801; H04L 27/3405; H04L 47/12; H04H 20/69
See application file for complete search history.

(56) References Cited

U.S. PATENT DOCUMENTS 6,459,703 B1 * 10/2002 Grimwood ............ H04J 3/1694
370/441

8,797,854 B2 * 8/2014 Bernstein ........... H04N 21/6118
370/329

(Continued)

FOREIGN PATENT DOCUMENTS

DE   112017003501 T5 *  3/2019  ......... H04L 47/6215
WO   WO-2018013490 A1 *  1/2018  ......... H04L 47/6215

OTHER PUBLICATIONS

J. Andreoli-Fang and J. T. Chapman, "Mobile-aware scheduling for low latency backhaul over DOCSIS," 2017 IEEE 28th Annual International Symposium on Personal, Indoor, and Mobile Radio Communications (PIMRC), 2017, pp. 1-6, doi: 10.1109/PIMRC. 2017.8292173.*

(Continued)

*Primary Examiner* — Berhanu Tadese
(74) *Attorney, Agent, or Firm* — Brokaw Patent Law PC; Christopher J. Brokaw

(57) ABSTRACT

Performing distributed Remote PHY scheduling operations. A low latency scheduler is disposed within or in proximity to a Remote PHY node. Upon identifying that a particular data flow qualifies for processing by the low latency scheduler, the low latency scheduler performs upstream Remote PHY scheduling operations for the particular data flow using a one or more dedicated channels that are designated as low latency channels. The Remote PHY upstream scheduling operations define when data may be transmitted by a Cable Modem (CM) to a Converged Cable Access Platform (CCAP) Core. A centralized scheduler is also located at the CCAP Core. The centralized scheduler performs Remote PHY upstream scheduling operations for all data flows which have not been identified as qualifying for processing by the low latency scheduler.

20 Claims, 7 Drawing Sheets

(56) References Cited

U.S. PATENT DOCUMENTS

| | | | | |
|---|---|---|---|---|
| 8,861,546 | B2* | 10/2014 | Yan | H04L 12/2801 370/468 |
| 9,130,769 | B2* | 9/2015 | Chapman | H04N 21/6118 |
| 9,363,188 | B2* | 6/2016 | Patrick | H04L 47/32 |
| 9,363,202 | B1* | 6/2016 | Al-Banna | H04L 12/2879 |
| 10,447,398 | B1* | 10/2019 | Al-Banna | H04L 5/0044 |
| 10,474,497 | B1* | 11/2019 | Kancharla | G06F 9/4875 |
| 10,581,530 | B2* | 3/2020 | Campos | H04B 10/501 |
| 10,616,126 | B2* | 4/2020 | Patrick | H04L 47/629 |
| 10,652,917 | B2* | 5/2020 | Andreoli-Fang | H04W 72/1252 |
| 10,764,114 | B2* | 9/2020 | Chapman | H04L 41/06 |
| 10,798,603 | B2* | 10/2020 | Chapman | H04W 72/1252 |
| 10,841,936 | B2* | 11/2020 | Chapman | H04W 72/1236 |
| 10,911,210 | B2* | 2/2021 | Liu | H04L 12/2801 |
| 10,931,380 | B2* | 2/2021 | Campos | H04L 12/2878 |
| 11,005,618 | B1* | 5/2021 | Bonen | H04L 47/781 |
| 11,206,440 | B1* | 12/2021 | Macauley | H04N 21/2668 |
| 11,252,742 | B2* | 2/2022 | Andreoli-Fang | H04W 28/0278 |
| 2013/0074138 | A1* | 3/2013 | Chapman | H04N 21/64707 725/111 |
| 2014/0101711 | A1* | 4/2014 | Rakib | H04L 12/2885 725/129 |
| 2015/0172072 | A1* | 6/2015 | Rakib | H04L 12/2801 725/111 |
| 2015/0188668 | A1* | 7/2015 | Al-banna | H04L 5/0044 370/208 |
| 2015/0295684 | A1* | 10/2015 | Jin | H04L 5/0007 370/390 |
| 2017/0019347 | A1* | 1/2017 | Al-banna | H04L 5/0037 |
| 2017/0265216 | A1* | 9/2017 | Andreoli-Fang | H04W 84/045 |
| 2017/0303273 | A1* | 10/2017 | Jin | H04L 47/822 |
| 2018/0013691 | A1* | 1/2018 | Patrick | H04L 47/6215 |
| 2018/0145757 | A1* | 5/2018 | Weeber | H04B 10/2507 |
| 2018/0270103 | A1* | 9/2018 | Chapman | H04L 1/1887 |
| 2018/0294941 | A1* | 10/2018 | Chapman | H04B 3/487 |
| 2019/0097945 | A1* | 3/2019 | Chapman | H04L 12/2861 |
| 2019/0149245 | A1* | 5/2019 | Campos | H04L 12/2878 398/212 |
| 2019/0274064 | A1* | 9/2019 | Chapman | H04W 28/0289 |
| 2019/0281362 | A1* | 9/2019 | Wiley | H04L 12/2869 |
| 2020/0053018 | A1* | 2/2020 | White | H04L 47/11 |
| 2020/0106530 | A1* | 4/2020 | Campos | H04L 67/10 |
| 2020/0244431 | A1* | 7/2020 | Liu | H04L 5/14 |
| 2020/0245346 | A1* | 7/2020 | Chapman | H04W 72/1236 |
| 2020/0302407 | A1* | 9/2020 | Willis | G06Q 20/102 |
| 2021/0029049 | A1* | 1/2021 | Assouline | H04L 67/61 |
| 2021/0119941 | A1* | 4/2021 | Hoole | H04L 49/90 |
| 2021/0136050 | A1* | 5/2021 | Leventer | H04L 12/4633 |
| 2021/0152386 | A1* | 5/2021 | Chari | H04L 41/40 |
| 2021/0160090 | A1* | 5/2021 | Orban | H04L 12/281 |
| 2021/0160091 | A1* | 5/2021 | Foley | H04N 21/6168 |
| 2021/0160454 | A1* | 5/2021 | Cloonan | H04N 7/106 |
| 2021/0351906 | A1* | 11/2021 | Beshai | H04J 14/0267 |
| 2022/0060346 | A1* | 2/2022 | Sevindik | H04L 12/2801 |
| 2022/0060347 | A1* | 2/2022 | Sevindik | H04W 28/06 |
| 2022/0124749 | A1* | 4/2022 | Andreoli-Fang | H04W 72/1252 |

OTHER PUBLICATIONS

Z. Alharbi, A. S. Thyagaturu, M. Reisslein, H. ElBakoury and R. Zheng, "Performance Comparison of R-PHY and R-MACPHY Modular Cable Access Network Architectures," in IEEE Transactions on Broadcasting, vol. 64, No. 1, pp. 128-145, Mar. 2018, doi: 10.1109/TBC.2017.2711145.*

Chapman et al, Impact of CCAP to CM Distance in a Remote PHY Architecture, Spring Technical Forum Proceedings, May 2015 (Year: 2013).*

Andreoli-Fang et al, Real-time Experimentation with Mobile-Aware Scheduling for Low Latency Backhuaul over DOCSIS, IEEE, Apr. 2018 (Year: 2018).*

Probing DOCSIS 3.1 messages (P-MAP or Probe MAP), by Excentis 2017 (Year: 2017).*

Alharbi et al, Performance Comparison of R-PHY and R-MACPHY Modular Cable Access Network Architectures, IEEE 2018 (Year: 2018).*

* cited by examiner

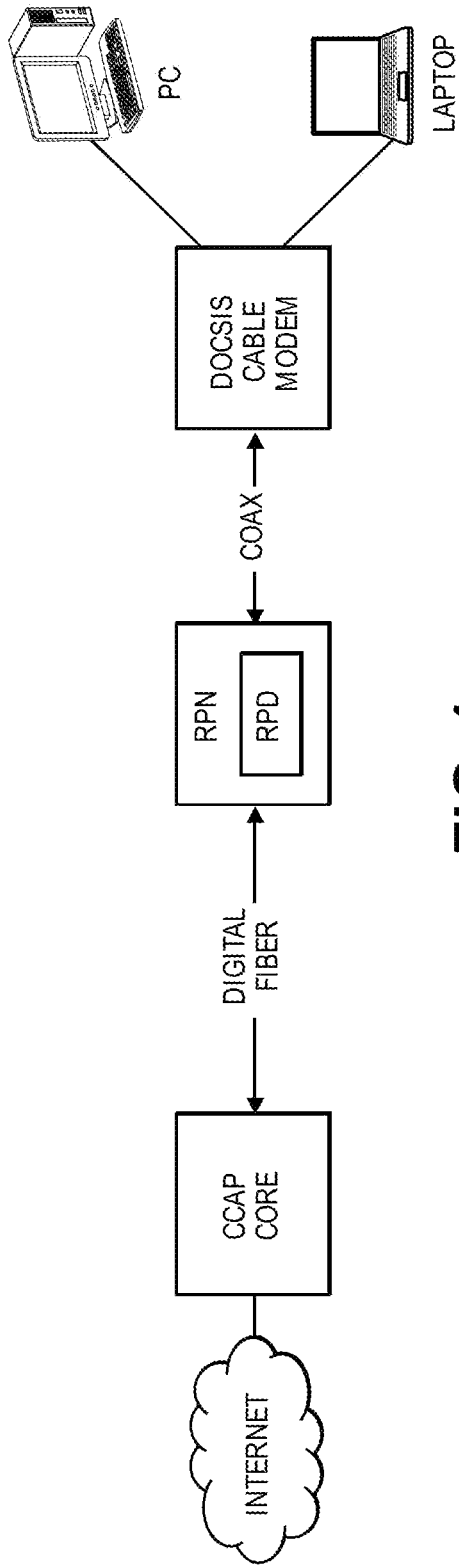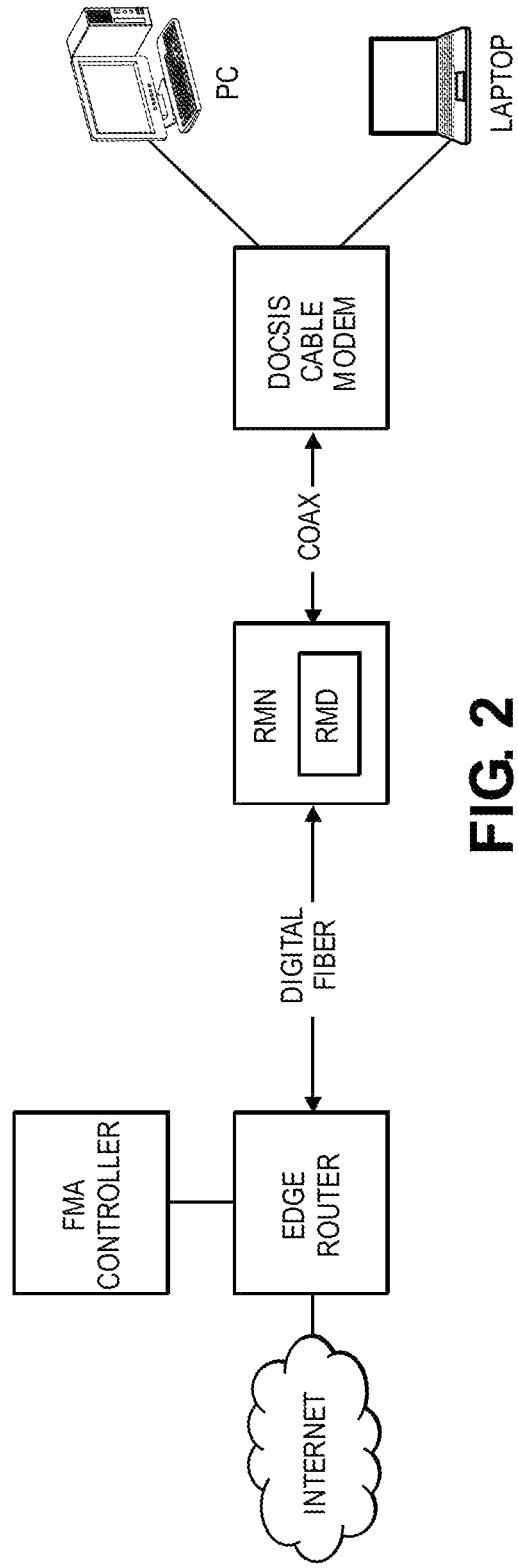

DISTRIBUTED SCHEDULING IN REMOTE PHY

CLAIM OF PRIORITY

This application claims priority to U.S. Provisional Application Ser. No. 62/944,651, filed Dec. 6, 2019, entitled "Distributed Scheduling in Remote PHY," the entire contents of which are hereby incorporated by reference for all purposes as if fully set forth herein.

FIELD OF THE INVENTION

Embodiments of the invention relate to distributed Remote PHY scheduling operations.

BACKGROUND

A Converged Cable Access Platform (CCAP) is an industry standard platform for transmitting video data and voice content. The CCAP platform is specified by CableLabs of Louisville, Colo. CableLabs has publicly issued a Remote PHY family of specifications, known as the MHAv2 specifications (Modular Headend Architecture version 2). The MHAv2 specifications describe how a CCAP platform may be separated into two components, (1) a CCAP Core located at a cable headend, and (2) a Remote PHY device (RPD), which is typically located outdoors. An RPD may be located, for example, at the junction of the fiber and coax plants in an optical node serving as a Remote PHY Node (RPN).

FIG. 1 is a block diagram of an exemplary CCAP system which includes an RPD situated inside an RPN in accordance with the MHAv2 specifications of the prior art. The RPD of FIG. 1 communicates over a digital fiber network using Ethernet/IP to other networking devices "upstream" (i.e., in the direction from the RPD to the CCAP Core). In the "downstream" direction (i.e., in the direction from the RPD to a Data Over Cable Service Interface Specification (DOCSIS) cable modem), the RPD modulates information streams (data, video, voice, etc.) into a radio frequency (RF) signals that are carried over coaxial cables, and demodulates similar such streams from received RF signals.

CableLabs has also issued specifications about the R-MACPHY architecture, which includes a Remote MAC-PHY Device (RMD) which resides in a Remote MACPHY node (RMN). These specifications describe Remote MAC-PHY (or MAC-PHY) as a generic term given to the distributed Cable Modem Termination System (CMTS)/CCAP architecture where the Data Over Cable Service Interface Specification (DOCSIS)-MAC and PHY layer processing of a CMTS are moved from the headend down to a Fiber Node location. FIG. 2 is a block diagram of a Remote-MACPHY system which includes a RMD situated inside a Remote MACPHY Node RMN in accordance with the MHAv2 specifications of the prior art.

Each of the Remote-PHY and Remote-MACPHY architectures, shown in FIGS. 1 and 2 respectively, exhibits several advantages and disadvantages relative to the other. While the Remote-PHY architecture of FIG. 1 is generally considered simpler and easier to implement and operate, most of the advantages of the Remote-PHY architecture derive from the fact that the RPD implements a lesser set of the CCAP processing than the RMD. A remote node (either a RPN or an RMN) is typically mounted in an outdoor environment, where environment conditions are harsh and gaining physical access is often difficult. As the RMD implements more functions than an RPD, the RMD typically requires considerably more CPU power to execute more elaborate software, consumes more power, and requires greater cooling support compared to an RPD. Moreover, the software of an RMD is updated more frequently than an RPD due to the greater number of software components in an RMD that potentially require updating. Once an RMD product is designed, there exists a practical limit to new software functions that the particular RMD product can support due to the fixed nature of available CPU and other computing resources in the RMD. In contrast, in a Remote-PHY system most of the new features are implemented at the CCAP core, which allows for the new features to be more easily upgraded or added. These and other reasons explain why all distributed CCAP deployments to date utilize the Remote-PHY architecture.

However, the Remote-MACPHY architecture has its advantages as well. The most pronounced advantage of a Remote-MACPHY system over a Remote-PHY system is the potential for lower latency treatment of DOCSIS data traffic. In the DOCSIS system, normal upstream traffic incurs a delay component consisted of three times the amount of signal travel time across the link between a cable modem at the customer premise and the DOCSIS upstream scheduler. To appreciate this delay, consider FIG. 3, which is a block diagram of a Remote-PHY system which includes a centralized DOCSIS upstream scheduler situated inside the CCAP core in accordance with the MHAv2 specifications of the prior art. The DOCSIS upstream scheduler shown in FIG. 3 is a component of the CCAP Core, which is typically located at the cable operator headend. For a cable modem to transmit DOCSIS data to the CCAP Core, a request must be sent from the cable modem to the CCAP Core (the first trip), a transmit opportunity is communicated from the CCAP Core to the cable modem (the second trip), and then the cable modem transmits to DOCSIS data upstream to the CCAP Core (the third trip).

In contrast, in a Remote-MACPHY system, the DOCSIS upstream scheduler resides in the RMD (which is typically deployed in a RMN located at the junction of the fiber and coax plants situated close to the subscriber premise). In a Remote-MACPHY system, the upstream traffic is still conveyed to the cable operator headend for a single trip delay, however, the 3-trip portion is limited only to the physical distance between the CM and the RMD. Thus, there exists a latency difference equivalent to twice the travel time between the physical location of the RMD and the physical location of the headend. Specifically, because the upstream scheduler operates closer to the cable modem, the latency required to obtain an upstream transmit opportunity is less in a Remote-MACPHY system compared to a Remote PHY system. This latency difference will even further increase if the cable operator elects to centralize the deployment of the Remote-PHY CCAP core, by placing it further away from the customer premise, such as in a regional data center.

Market research conducted by cable operators and industry organizations has shown that there are many applications in which providing selective lower latency in the DOCSIS access network may make the network more attractive to customers of these applications. However, some specific applications were identified as requiring a maximum latency in the access system which is lower than the latency achievable in a Remote-PHY system due to the long distance between the CCAP core and the customer premise. Market research also indicated a willingness of users of these low latency applications to pay a higher cost for service with improved latency performance. Thus, being able to provide lower latency treatment to specific applications is advantageous to cable operators as well as their customers.

A proposal to amend the Remote-PHY architecture by moving the DOCSIS upstream scheduler functionality of the CCAP core to the RPD has been made. Such a modified Remote-PHY system under this proposal would enjoy the same potentially lower latency benefits that are experienced by a Remote-MACPHY system. Unfortunately, there exists quite a few difficulties and challenges in implementing such a change.

While the functions performed by the DOCSIS upstream scheduler are specified in CableLabs' DOCSIS specifications, the implementation of such a DOCSIS upstream scheduler is not. Thus, there may exist different implementations of a DOCSIS upstream scheduler by different CCAP vendors. The implementation of a DOCSIS upstream scheduler includes various proprietary algorithms and optimizations. Some DOCSIS technology experts doubt that a Remote-PHY system in which the DOCSIS upstream scheduler functionality resides in the RPD can be composed of interoperable components when the CCAP core is developed by one vendor and the RPD (including an upstream scheduler) by another.

Even if such interoperability could be achieved, moving the DOCSIS upstream scheduler from the CCAP core to the RPD also means that much of the CPU power normally required for the CCAP core operation has to also be exported to the RPD. Thus, a Remote-PHY system with an upstream scheduler in the RPD may lose much of the potential advantages over a Remote-MACPHY system, such as the required CPU size, the required cooling capability, the required frequency of software upgrades, and the limitation in supporting future new scheduling features.

Some prior art proposals introduced the concept of a split functionality distributed scheduler. FIG. 4 is a block diagram of a Remote-PHY system implementing a split functionality DOCSIS upstream scheduler, with the high-level scheduler algorithms situated inside the CCAP core and the low-level scheduler algorithms situated inside the RPD, in accordance with prior art. Note that the bulk of the scheduler's CPU intensive work is implemented in the scheduler low-level functions. Low-level functions are those that generate the upstream MAP, which is the MAC management message that the CCAP uses to allocate transmission opportunities to cable modems based on data transmission requests from the cable modems. These low-level functions are real time functions that directly affect the latency applied to any upstream transmission. The high-level algorithms are those algorithms that apply overall oversight of traffic patterns (e.g., long term restrictions and caps to traffic of individual user flows). The high-level algorithms do not have an immediate effect on latency experienced by data flows, as their impact is more slowly felt over time.

Proposals of this nature possess disadvantages. Since all DOCSIS upstream scheduler implementations are essentially proprietary, it was not made clear exactly what constitutes a higher level of functionality versus a lower level of functionality. It is also obvious that interoperability between different vendors of CCAP cores and RPDs will be practically impossible when a split function scheduler is involved, as a cornucopia of complications will ensue due to the split functionality distributed scheduler requiring two interacting algorithms or methodologies rather than a single concise algorithm or methodology.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 1 is a block diagram of a CCAP system which includes a Remote PHY node (RPN) in accordance with the MHAv2 specifications of the prior art;

FIG. 2 is a block diagram of a Remote-MACPHY system which includes a Remote MACPHY Device (RMD) situated inside a Remote MACPHY Node (RMN) in accordance with the MHAv2 specifications of the prior art;

DETAILED DESCRIPTION OF THE INVENTION

Approaches for distributed Remote PHY scheduling operations are presented herein. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form or discussed at a high level to avoid unnecessarily obscuring teachings of embodiments of the invention.

Approaches for achieving reduced latency for specific latency-sensitive data flows by a distributed DOCSIS upstream scheduler system are presented herein. It is been observed by the inventor that only a smaller portion of data flows are data flows which are very sensitive to latency and can largely benefit from low latency. Characterization of data flows from applications and services that benefit from experiencing low latency in their data flows, conducted over a large active Remote-PHY system serving a variety of customers, has indicated to the inventor that the total data throughput of such low latency applications and services is a small portion, estimated at about three percent of the total upstream data throughput from the served customers in the Remote-PHY system. Other observations made by the inventor from the characterization of data flows are that the low latency data flows are typically composed of a periodically transmitted and relatively small transmission packet.

In an embodiment of the invention, the work performed by the DOCSIS upstream scheduler system is distributed between a default scheduler and a low latency scheduler. The default scheduler, located at a Converged Cable Access Platform (CCAP) Core or upstream from a remote node, performs Remote PHY upstream scheduling operations for all data flows which have not been designated to receive a low latency experience. Those data flows that have been designated to receive a low latency experience are handled not by the default scheduler, but instead are processed by a low latency scheduler disposed within a Remote PHY node such that the low latency scheduler performs upstream Remote PHY scheduling operations for those data flows. Remote PHY upstream scheduling operations define when data may be transmitted by a Cable Modem (CM) to the CCAP Core.

Figure 3:
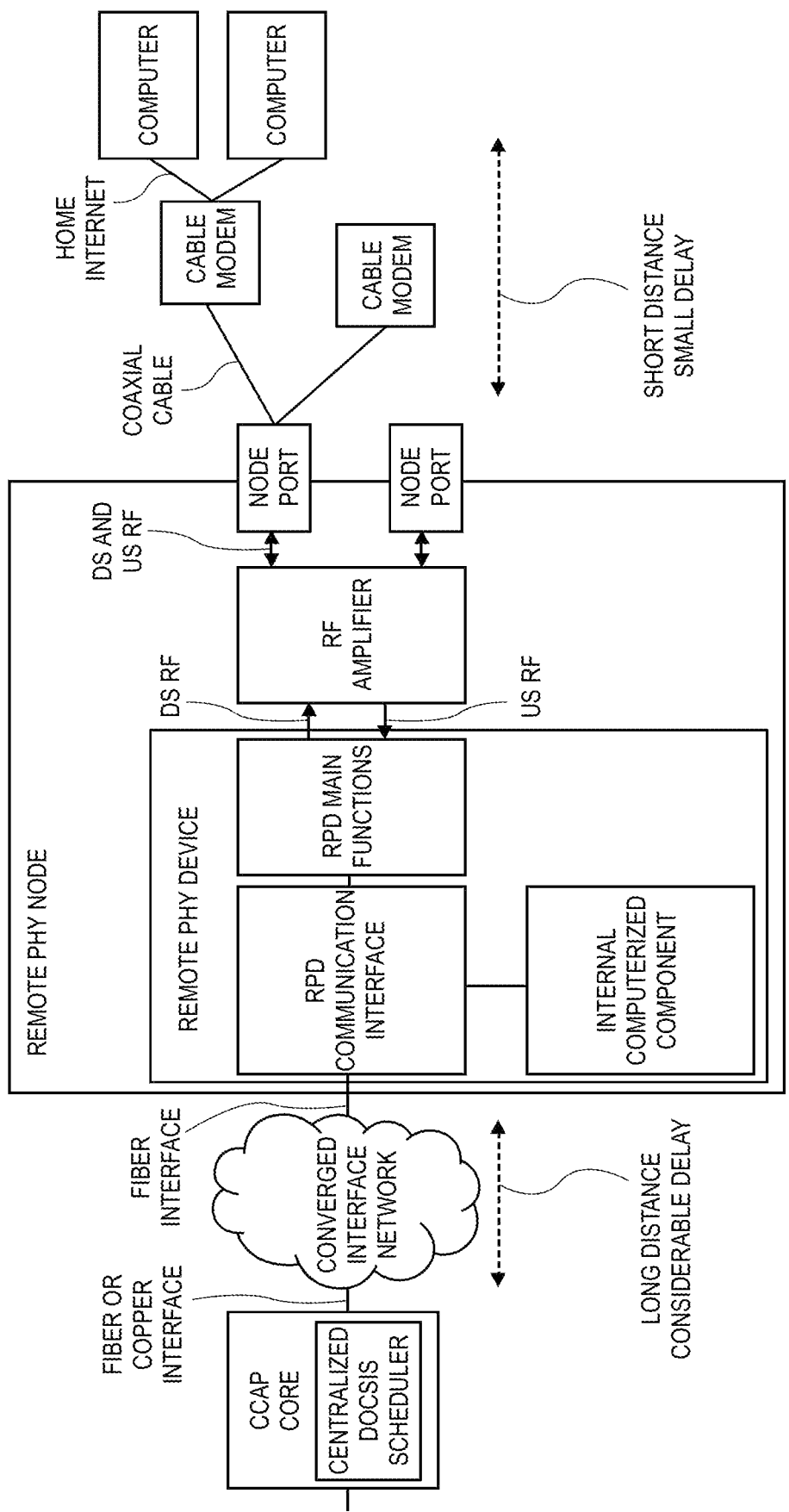
FIG. 3 is a block diagram of a Remote-PHY system which includes a centralized DOCSIS upstream scheduler situated inside the CCAP core in accordance with the MHAv2 specifications of the prior art.
Figure 4:
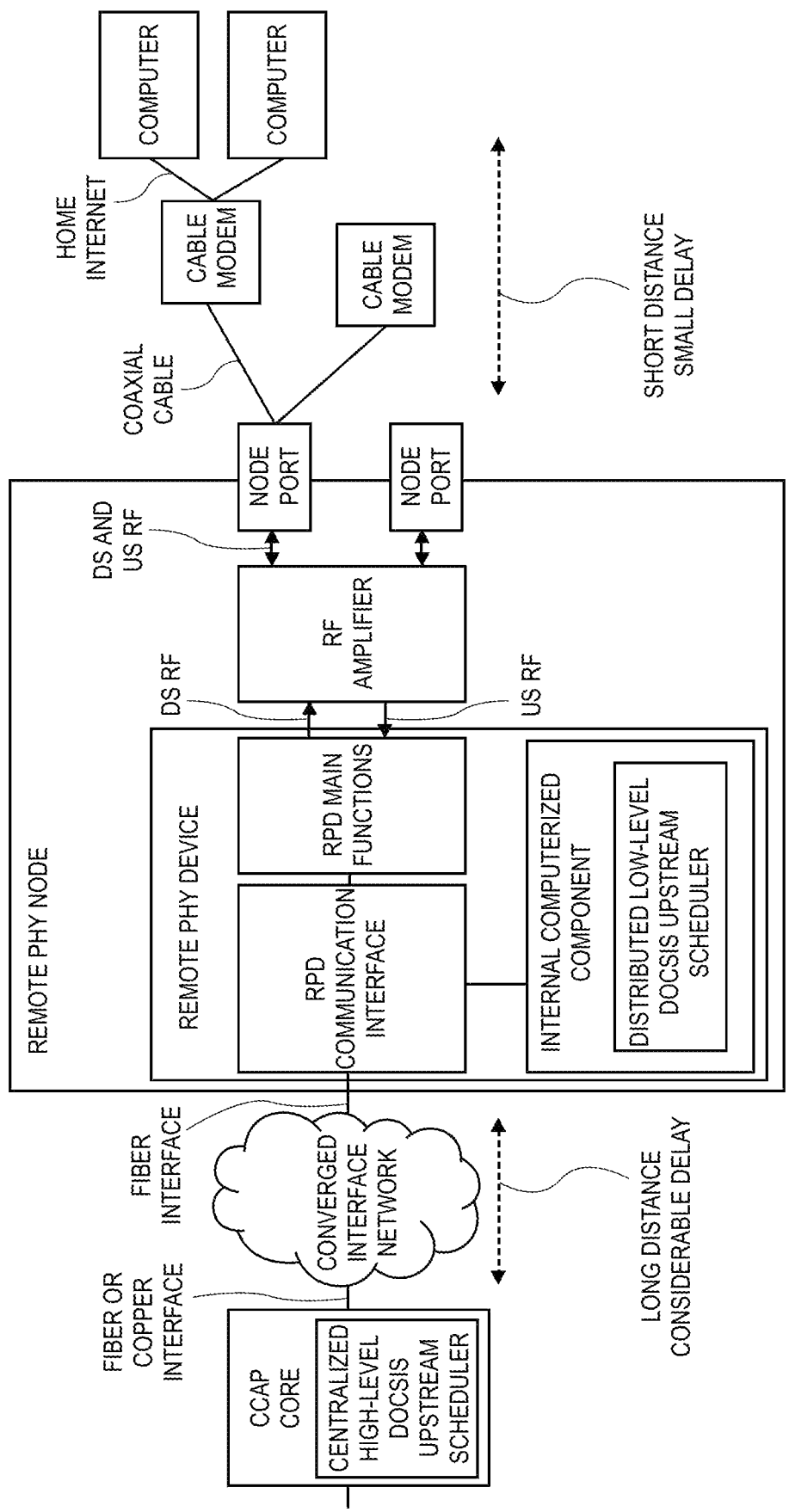
FIG. 4 is a block diagram of a Remote-PHY system implementing a split functionality DOCSIS upstream scheduler, with the high-level scheduler algorithms situated inside the CCAP core and the low-level scheduler algorithms situated inside the RPD, in accordance with prior art.
Figure 5:
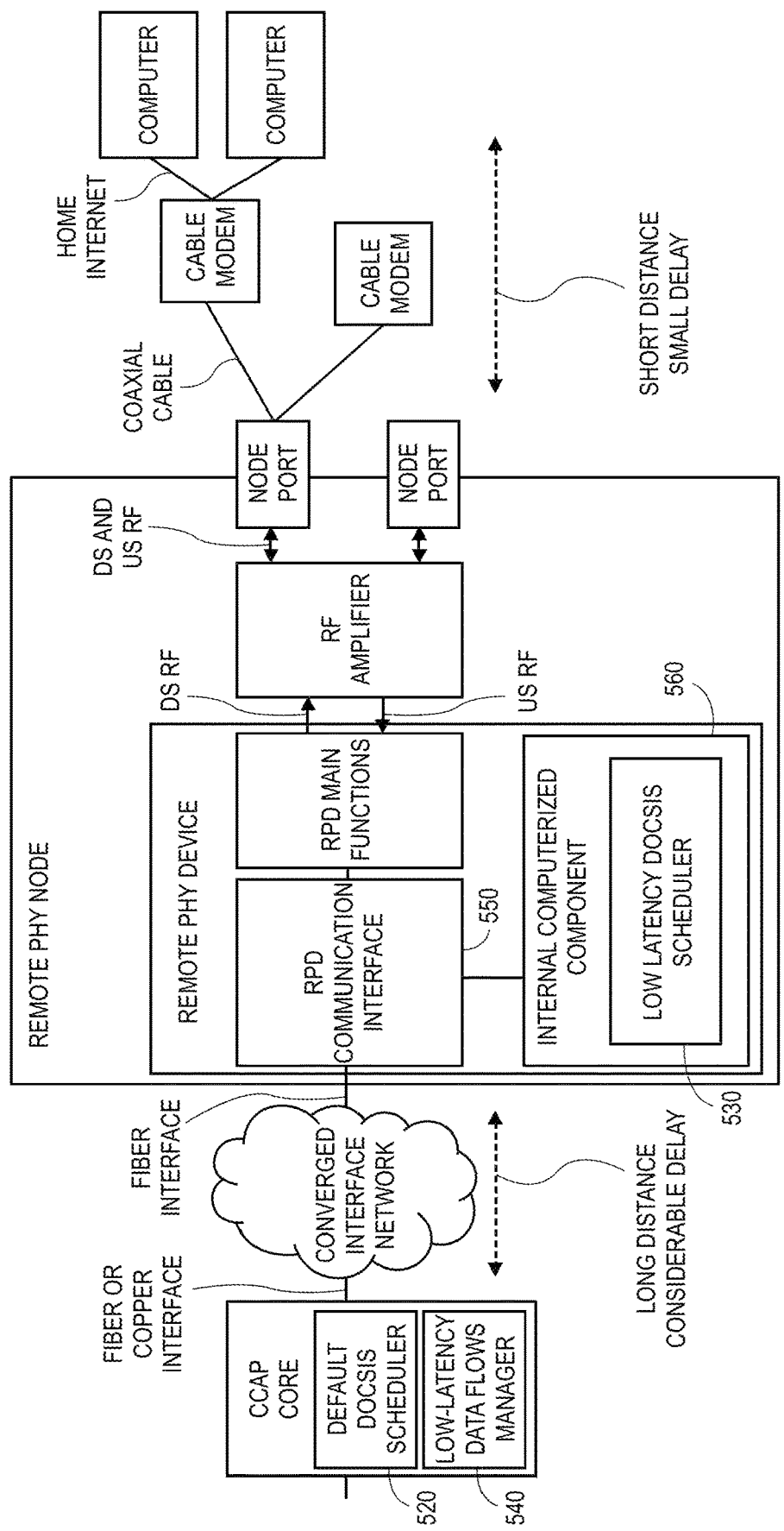
FIG. 5 is a block diagram of a Remote-PHY system implementing a distributed DOCSIS upstream scheduler in accordance with an embodiment of the invention.

FIG. 5 is a block diagram of a Remote-PHY system implementing a distributed DOCSIS upstream scheduler in accordance with an embodiment of the invention. FIG. 5 depicts default DOCSIS scheduler 520 and low latency DOCSIS scheduler 530. Default DOCSIS scheduler 520 is shown in FIG. 5 as situated inside the CCAP Core. In other embodiments not shown in FIG. 5, default DOCSIS scheduler 520 may be implemented by an entity northbound of the CCAP core. Low latency DOCSIS scheduler 530 is shown situated inside of the RPD in the embodiment of FIG. 5. Low latency DOCSIS scheduler 530 may be implemented in an internal computerized element within the RPD. In other embodiments not shown in FIG. 5, low latency DOCSIS scheduler 530 may be implemented by an entity northbound of the RPD but in a relatively proximity thereto.

While only one Remote PHY Node is depicted in FIG. 5, in any practical implementation, a substantial number of separate Remote PHY nodes will be deployed. Thus, while only one low latency DOCSIS scheduler 530 is depicted in FIG. 5, in a practical deployment, each RPN may possess a low latency DOCSIS scheduler 530.

In an embodiment, default DOCSIS scheduler 520 implements the processing, such as Remote PHY upstream scheduling operations, for all but a subset of the upstream channels handled by the CCAP core. The subset of channels that are not handled by default DOCSIS scheduler 520 are referred to herein as remotely scheduled channels. Remote PHY upstream scheduling operations are performed for the remotely scheduled channels by low latency DOCSIS scheduler 530. A remotely scheduled channel may be a Single-Carrier Quadrature Amplitude Modulation (SC-QAM) channel or an Orthogonal Frequency Division Multiplexing (OFDM) channel.

Since the data throughput of the upstream data flows that require low latency is such a small portion of the total upstream data throughput, in typical situations a single remotely scheduled channel is sufficient to contain all the low latency upstream data throughput. Moreover, that single remotely scheduled channel can be configured as a lower capacity channel than other upstream channels. In some situations, that channel may be configured with lower modulation depth and higher forward error correction capability than other channels, making the remotely scheduled channel less prone to noise interference and suitable to be placed in a lower frequency part of the spectrum where more noise and interference is known to exist.

Figure 6:
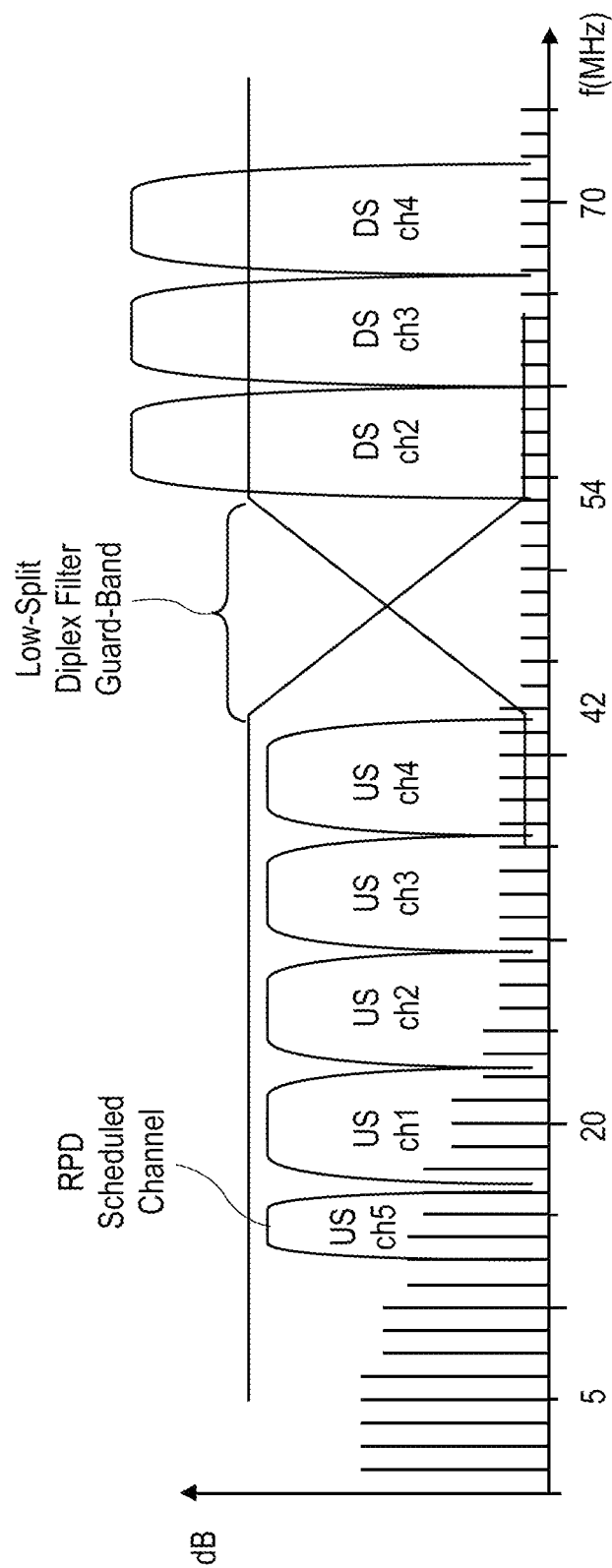
FIG. 6 is an illustration of the lower spectrum of a typical sub-split cable system with a single upstream channel scheduled by the RPD, several upstream channels scheduled by the CCAP core, and a number of downstream channels, in accordance with an embodiment of the invention.
Figure 7:
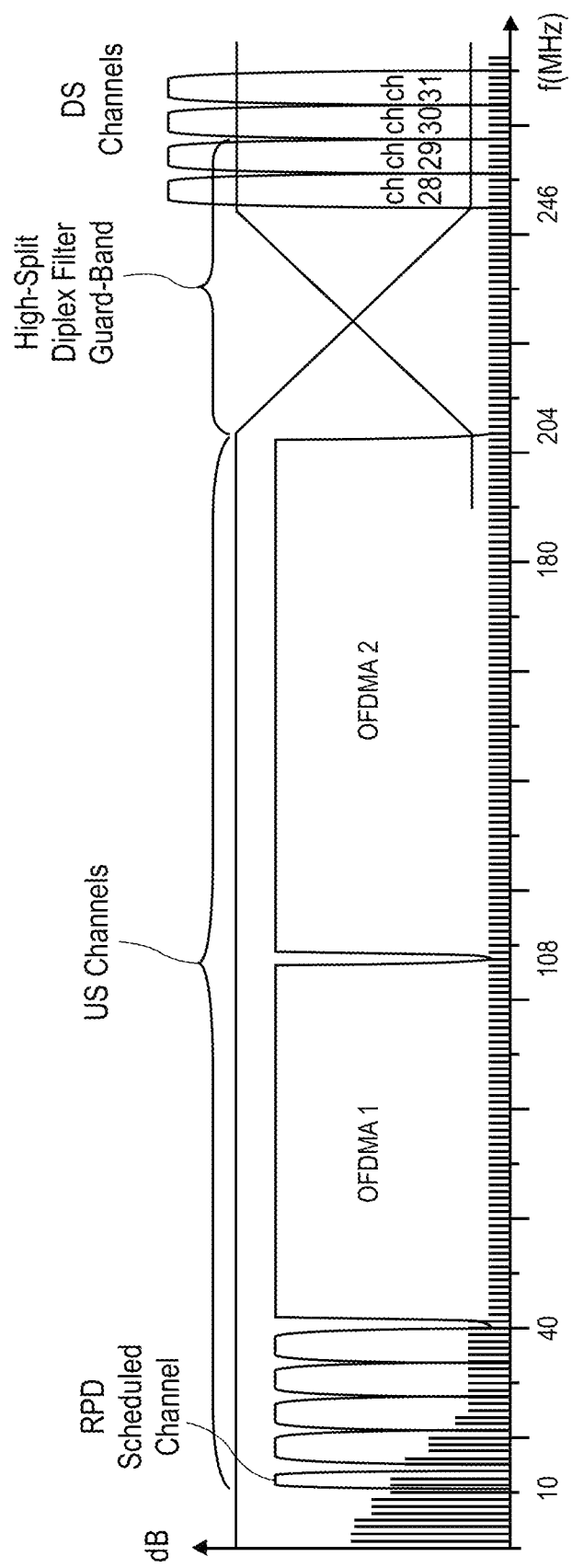
FIG. 7 is an illustration of the lower part of a typical high-split cable system spectrum with a single upstream channel scheduled by the RPD, several upstream channels scheduled by the CCAP core, and a number of downstream channels, in accordance with an embodiment of the invention.

To illustrate, consider FIG. 6, which is an illustration of the lower spectrum of a typical sub-split cable system with a single upstream channel scheduled by the RPD, several upstream channels scheduled by the CCAP core, and a number of downstream channels, in accordance with an embodiment of the invention. FIG. 7 is an illustration of the lower part of a typical high-split cable system spectrum with a single upstream channel scheduled by the RPD, several upstream channels scheduled by the CCAP core, and a number of downstream channels, in accordance with an embodiment of the invention.

In an embodiment, an element inside the CCAP core, low-latency data flow manager 540, may assign the remotely scheduled channels to be used only by user data flows for which low latency handling is commanded. In this way, only data flows commanded to enjoy lower latency handling will be assigned by low-latency data-flow manager 540 to the one or more remotely scheduled channels. The low-latency data flows that are desired to make use of a remotely scheduled channel may be identified by configuration (e.g., through the CableLabs-specified cable mode configuration files or through other configuration means) or through an automated and/or dynamic approach. An example of an automated and/or dynamic approach that may be used to identify a data flow that should be commended to use a remotely scheduled channel is discussed in U.S. application Ser. No. 16/937,020, entitled "Low Latency DOCSIS Experience Via Multiple Queues," filed on Jul. 23, 2020, the entire disclosure of which is hereby incorporated by reference for all purposes as if fully set forth herein. The data flows commanded to enjoy lower latency handling will only be assigned to one or more of the remotely scheduled channels and to no other channel. Note that revision 3.0 and above of the DOCSIS specification enables assigning data flows either to a single channel or to a group of channels known in the DOCSIS specification as a bonding group. Most regular data flows of DOCSIS 3.0 and above systems are typically assigned to a bonding group, but low latency flows of an embodiment are typically assigned to a single channel. Under an embodiment of this invention, even if there exist a plurality of remotely scheduled channels, low latency data flows may be assigned to a single specific remotely scheduled channel.

Since the remotely scheduled channels serve a different type of application and data flows (i.e., applications and data flows identified as requiring low latency) than the other "regular" channels (i.e., the channels other than the remotely scheduled channels), it is typically advantageous to configure low latency DOCSIS scheduler 530 handling the remotely scheduled channels with a different set of parameters than default DOCSIS scheduler 520 that handles the scheduling of the regular channels. For example, low latency DOCSIS scheduler 530 may set a parameter associated with latency, such as the MAP interval time and/or the MAP advance time, to a smaller duration than the value default DOCSIS scheduler 520 may set for the same parameter for a regular channel. Doing so serves to further reduce the latency experienced by applications and data flows served by the remotely scheduled channels.

Reducing the MAP interval time in this fashion increases the overhead shouldered by low latency DOCSIS scheduler 530 that is required to transmit these MAPs to cable modems over the downstream channels. However, since only a subset of the channels will be set with a shorter duration MAP interval time, the effect of the overhead is considerably smaller than if a shorter duration MAP interval time is set for all channels.

Embodiments of the invention operate such that transmission requests sent by cable modems for data flows using remotely scheduled channels are received by low latency DOCSIS scheduler 530. Under DOCSIS specifications, cable modems may only request upstream data transmission opportunities for a data flow on one of the channels that is used for transmitting the data flow downstream. Because embodiments operate under the principle that only data flows designated as low latency flows are configured to be transmitted on the remotely scheduled channels and only on the remotely scheduled channels, all transmission requests arriving on the remotely scheduled channels are for data flows commanded to be using the remotely scheduled channels, and no transmission request for any data in other flows may use the remotely scheduled channels. Thus, an embodiment of the invention may simply divert all the data transmission requests arriving on remotely scheduled channels to low latency DOCSIS scheduler 530 rather than forwarding such transmission request to the CCAP core as done for all the transmission requests arriving on regular channels. Such transmission requests arriving on remotely scheduled channels may be diverted by either a software or hardware mechanism contained in the RPD, such as RPD Communication Interface 550.

Another embodiment of the invention may implement low latency DOCSIS scheduler 530 in an external unit to the RPD itself, e.g., in a separate module inside the Remote-PHY node or outside the Remote-PHY node. In this embodiment, the data transmission requests arriving on the remotely scheduled channels are diverted to low latency DOCSIS scheduler 530 using established data forwarding mechanisms such as, but not limited to, Ethernet and IP switching.

A small number of upstream transmission requests are expected for every MAP duration for data flows originating from low latency benefitting applications and services. This is so because applications and services that are identified as benefitting from low latency data flows require relatively low upstream throughput, especially when the MAP interval time is reduced. This fact, coupled with the behavior of an embodiment of the invention in which a data flow is allocated to use a single upstream channel, results in a great simplification to the complexity shouldered by low latency DOCSIS scheduler 530. This is especially true when the single channel is of the type Advanced Time Division Multiple Access (ATDMA) rather than Orthogonal Frequency Division Multiple Access (OFDMA), Low latency DOCSIS scheduler 530 does not need to handle a large database of cable modems, data flows, or alternative channels where these data flows can be allocated transmit opportunities. These traits allow for embodiments to implement low latency DOCSIS scheduler 530 in a small CPU, a primitive CPU, low-power CPU, a CPU that was not originally allocated for such tasks and has little spare computation power, or even a hardware machine (e.g., FPGA). This smaller database requirement also allows for the implementation of low latency DOCSIS scheduler 530 without external memory, thereby greatly limiting the amount of additional power consumption and cooling associated with adding low latency DOCSIS scheduler 530 to an RPD.

Since low latency DOCSIS scheduler 530 handles just a subset of the upstream channels, low latency DOCSIS scheduler 530 receives only a subset of the upstream transmission requests. Consequently, low latency DOCSIS scheduler 530 generates and transmits only a portion of the MAPs conveying the transmit opportunities to cable modems. Accordingly, an embodiment of the invention typically handles only a small portion of the complete traffic to and from default DOCSIS scheduler 520, which prevents overburdening the communication link between an internal computerized component 560 used to implement low latency DOCSIS scheduler 530 and the RPD Communication Interface 550.

Embodiments may perform latency non-critical functions for the remotely scheduled channels at different locations. Latency non-critical functions, such as initiating initial and periodical modem maintenance, may be performed for the remotely scheduled channels by low latency DOCSIS scheduler 530 by an embodiment. Alternately, another embodiment may perform such latency non-critical functions at the CCAP Core, a non- limiting example being by default DOCSIS scheduler 520. When performance of latency non-critical functions are performed at the CCAP Core, the CCAP Core may be configured to request of low latency DOCSIS scheduler 530 to consider specific transmit opportunities and to add to its generated MAPs to schedule such transmissions as initial and periodical modem maintenance.

As with regularly scheduled channels, remote scheduled channels are not expected to be fully utilized in conveying upstream data at every point in time. Low latency DOCSIS scheduler 530 may use available unrequested channel capacity by providing unsolicited transmission opportunities to specific data flows as well as make available for an abundant of opportunities for cable modems to request a transmission opportunity when cable modems have data to transmit.

An embodiment of the invention may mitigate communication problems that occur between one or more cable modems and the CCAP core (through the RPD) over a remotely scheduled channel. An example of such a communication problem is when a remotely scheduled channel experiences a high level of ingress noise, thereby causing packet loss to low latency data flows utilizing the remotely scheduled channel. To mitigate this communication problem, low latency DOCSIS scheduler 530 may reassign the data flows experiencing packet loss to another remotely scheduled channel that is not experiencing communication problems, thereby preserving the low latency handling of the data flows. Alternatively, low latency DOCSIS scheduler 530 may reassign the data flows experiencing packet loss to a channel scheduled by low latency DOCSIS scheduler 530, which forfeits the benefits of low latency handling but maintains reliable communications for the affected data flows. In other embodiments, Low-Latency Data Flows Manager 540 may be charged this task of reassigning the data flows experiencing packet loss to another channel.

Figure 8:
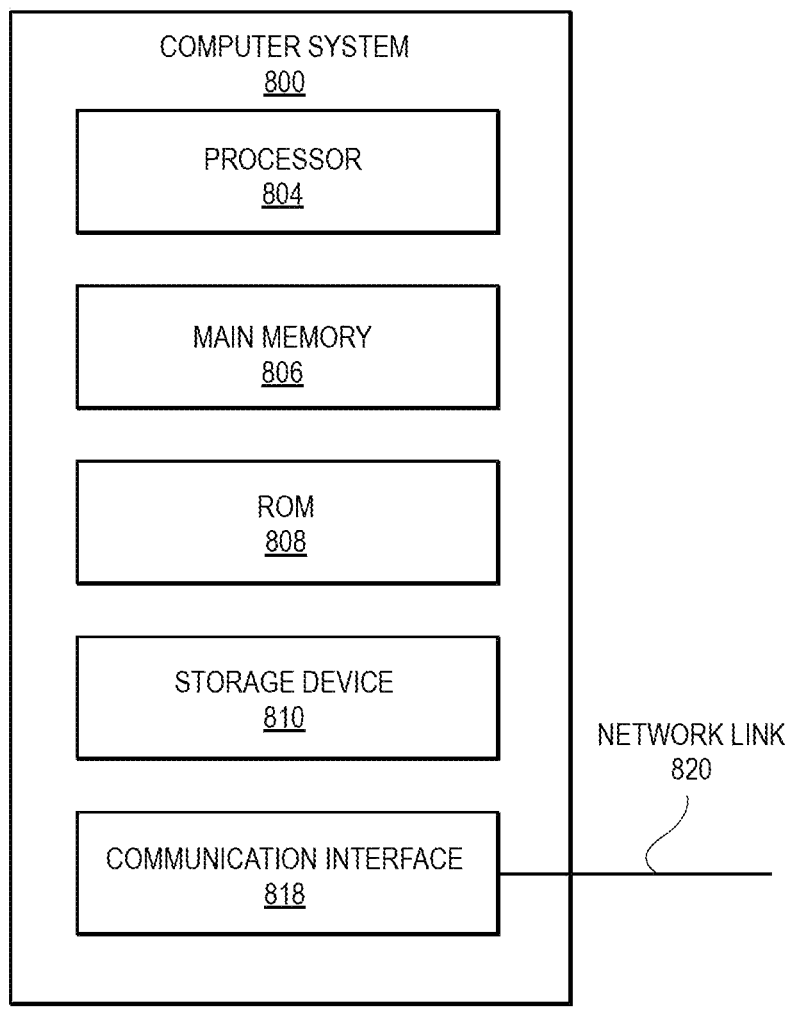
FIG. 8 is a block diagram of a computer system that may correspond to, or upon which may be implemented, a Remote-PHY device (RPD) or any component performing a function or portion of the CCAP Core in accordance with an embodiment of the invention.

In an embodiment, the Remote-PHY device (RPD) depicted in FIG. 5, or any component performing a function or portion of the CCAP Core, may correspond to, or be implemented on, a computer system, such as computer system 800 depicted by the block diagram of FIG. 8. In an embodiment, computer system 800 includes processor 804, main memory 806, ROM 808, storage device 810, and communication interface 818. Computer system 800 includes at least one processor 804 for processing information. Computer system 800 also includes a main memory 806, such as a random-access memory (RAM) or other dynamic storage device, for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device for storing static information and instructions for processor 804. A storage device 810, such as a magnetic disk or optical disk, is provided for storing information and instructions.

Embodiments of the invention are related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory computer-readable storage medium" as used herein refers to any tangible medium that participates in storing instructions which may be provided to processor 804 for execution. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory computer -readable media may be involved in carrying one or more sequences of one or more instructions to processor 804 for execution. For example, the instructions may initially be carried on a magnetic disk of a remote computer. The remote computer can load the instructions into its dynamic memory and send the instructions over a network link 820 to computer system 800.

Communication interface 818 provides a two-way data communication coupling to a network link 820 that is connected to a local network. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through a local network to a host computer or to data equipment operated by an Internet Service Provider (ISP).

Computer system 800 can send messages and receive data, including program code, through the network(s), network link 820 and communication interface 818. For example, a server might transmit a requested code for an application program through the Internet, a local ISP, a local network, subsequently to communication interface 818. The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for performing distributed Remote PHY scheduling operations, which when executed, cause:
   upon identifying that a particular data flow qualifies for processing by a low latency scheduler, employing the low latency scheduler, disposed within a Remote PHY node, to perform upstream Remote PHY scheduling operations for the particular data flow using a one or more dedicated channels that are designated as low latency channels; and
   employing a centralized scheduler, located at a Converged Cable Access Platform (CCAP) Core, to perform Remote PHY upstream scheduling operations for all data flows which have not been identified as qualifying for processing by the low latency scheduler,
   wherein said Remote PHY upstream scheduling operations define when data may be transmitted by a Cable Modem (CM) to the CCAP Core.

2. The one or more non-transitory computer-readable storage mediums of claim 1, wherein at least one of the one or more dedicated channels is a Single-Carrier Quadrature Amplitude Modulation (SC-QAM) channel or an Orthogonal Frequency Division Multiplexing (OFDM) channel.

3. The one or more non-transitory computer-readable storage mediums of claim 1, wherein the CCAP core or an entity northbound of the CCAP core dynamically identifies whether the particular data flow qualifies for processing by the low latency scheduler.

4. The one or more non-transitory computer-readable storage mediums of claim 1, wherein identifying whether the particular data flow qualifies for processing by the low latency channel is based, at least in part, on a configuration.

5. The one or more non-transitory computer-readable storage mediums of claim 1, wherein the low latency scheduler employs a different set of parameters in performing Remote PHY upstream scheduling operations than the centralized scheduler.

6. The one or more non-transitory computer-readable storage mediums of claim 5, wherein said different set of parameters include one or more of a different MAP interval time and a MAP advance time.

7. The one or more non-transitory computer-readable storage mediums of claim 1, wherein said Remote PHY node, or an entity external to said Remote PHY node, diverts all upstream transmission requests received on the one or more dedicated channels to said low latency scheduler.

8. The one or more non-transitory computer-readable storage mediums of claim 1, wherein said low latency scheduler performs a subset of all Remote PHY upstream channel scheduling for the one or more dedicated channels.

9. The one or more non-transitory computer-readable storage mediums of claim 1, wherein said CCAP core requests said low latency scheduler to schedule specific transmit opportunities for a subset of scheduling tasks not directly handled by said low latency scheduler.

10. The one or more non-transitory computer-readable storage mediums of claim 1, wherein said low latency scheduler provides both unsolicited and solicited opportunities to transmit upstream over the one or more dedicated channels.

11. The one or more non-transitory computer-readable storage mediums of claim 1, wherein said low latency scheduler or said centralized scheduler reassigns a data flow experiencing data packet loss to another channel that is not experiencing data packet loss.

12. One or more non-transitory computer-readable storage mediums storing one or more sequences of instructions for performing distributed Remote PHY scheduling operations, which when executed, cause:
   upon identifying that a particular data flow qualifies for processing by a low latency scheduler, employing the low latency scheduler, disposed within an entity in close proximity to a Remote PHY node and southbound to a Converged Cable Access Platform (CCAP) Core, to perform upstream Remote PHY scheduling operations for the particular data flow using a one or more dedicated channels that are designated as low latency channels; and
   employing a centralized scheduler, located at the CCAP Core, to perform Remote PHY upstream scheduling operations for all data flows which have not been identified as qualifying for processing by the low latency scheduler,
   wherein said Remote PHY upstream scheduling operations define when data may be transmitted by a Cable Modem (CM) to the CCAP Core.

13. A system for performing distributed Remote PHY scheduling operations, comprising:
   one or more processors; and
   one or more non-transitory computer-readable storage mediums storing one or more sequences of instructions, which when executed, cause:
      upon identifying that a particular data flow qualifies for processing by a low latency scheduler, employing the low latency scheduler, disposed within a Remote PHY node, to perform upstream Remote PHY scheduling operations for the particular data flow using a one or more dedicated channels that are designated as low latency channels; and
      employing a centralized scheduler, located at a Converged Cable Access Platform (CCAP) Core, to perform Remote PHY upstream scheduling operations for all data flows which have not been identified as qualifying for processing by the low latency scheduler,
      wherein said Remote PHY upstream scheduling operations define when data may be transmitted by a Cable Modem (CM) to the CCAP Core.

14. The system of claim 13, wherein the CCAP core or an entity northbound of the CCAP core dynamically identifies whether the particular data flow qualifies for processing by the low latency scheduler.

15. The system of claim 13, wherein said Remote PHY node, or an entity external to said Remote PHY node, diverts all upstream transmission requests received on the one or more dedicated channels to said low latency scheduler.

16. The system of claim 13, wherein said low latency scheduler or said centralized scheduler reassigns a data flow experiencing data packet loss to another channel that is not experiencing data packet loss.

17. A method for performing distributed Remote PHY scheduling operations, comprising:
   upon identifying that a particular data flow qualifies for processing by a low latency scheduler, employing the low latency scheduler, disposed within a Remote PHY node, to perform upstream Remote PHY scheduling operations for the particular data flow using a one or more dedicated channels that are designated as low latency channels; and
   employing a centralized scheduler, located at a Converged Cable Access Platform (CCAP) Core, to perform Remote PHY upstream scheduling operations for all data flows which have not been identified as qualifying for processing by the low latency scheduler,
   wherein said Remote PHY upstream scheduling operations define when data may be transmitted by a Cable Modem (CM) to the CCAP Core.

18. The method of claim 17, wherein the CCAP core or an entity northbound of the CCAP core dynamically identifies whether the particular data flow qualifies for processing by the low latency scheduler.

19. The method of claim 17, wherein said Remote PHY node, or an entity external to said Remote PHY node, diverts all upstream transmission requests received on the one or more dedicated channels to said low latency scheduler.

20. The method of claim 17, wherein said low latency scheduler or said centralized scheduler reassigns a data flow experiencing data packet loss to another channel that is not experiencing data packet loss.

\* \* \* \* \*